US00RE38991E

(19) United States
(12) Reissued Patent
Shaw et al.

(10) Patent Number: US RE38,991 E
(45) Date of Reissued Patent: Feb. 28, 2006

(54) MOTOR VEHICLE FUEL CAP INLET AND OUTLET VENT APPARATUS

(75) Inventors: Richard J. Shaw, Pewankee, WI (US); Richard M. Boyd, St. Louis Park, MN (US)

(73) Assignee: Gas Caps, Inc., Germantown, WI (US)

(21) Appl. No.: 10/815,196

(22) Filed: Mar. 31, 2004

Related U.S. Patent Documents

Reissue of:
(64) Patent No.: 6,364,145
Issued: Apr. 2, 2002
Appl. No.: 09/641,507
Filed: Aug. 21, 2000

(51) Int. Cl.
*B65D 51/16* (2006.01)

(52) U.S. Cl. ..... 220/203.11; 220/203.16; 220/203.28; 220/303

(58) Field of Classification Search ..... 220/203.02, 220/203.11, 203.13, 203.15, 203.16, 203.17, 220/203.18, 203.24, 203.25, 203.28, 303, 220/DIG. 33, DIG. 27
See application file for complete search history.

(56) References Cited

U.S. PATENT DOCUMENTS 3,511,407 A * 5/1970 Palma ..... 220/203.13
3,595,429 A * 7/1971 Kohen ..... 220/203.13
3,929,158 A * 12/1975 Rodgers ..... 137/493.9
4,337,873 A * 7/1982 Johnson ..... 220/203.02
4,379,470 A * 4/1983 Reutter ..... 137/493.8
4,436,219 A * 3/1984 Reutter ..... 220/295
4,440,308 A * 4/1984 Baker ..... 220/203.02
4,765,505 A * 8/1988 Harris ..... 220/288
4,787,529 A * 11/1988 Harris ..... 220/203.21
4,913,303 A * 4/1990 Harris ..... 220/203.21
5,108,001 A * 4/1992 Harris ..... 220/203.06
5,996,829 A * 12/1999 Hagano et al. ..... 220/203.23
6,003,709 A * 12/1999 Hagano et al. ..... 220/88.1
6,227,176 B1 * 5/2001 Hettmann ..... 123/516
6,227,242 B1 * 5/2001 Kleppner ..... 137/574

FOREIGN PATENT DOCUMENTS

DE 2756689 * 6/1978
FR 2610297 * 8/1988
JP 59-40070 * 3/1984

* cited by examiner

*Primary Examiner*—Nathan J. Newhouse
(74) *Attorney, Agent, or Firm*—Quarles & Brady LLP

(57) ABSTRACT

A vehicle fuel or gas tank is subjected to either a build up of pressure or a negative pressure, and in view of this inlet and outlet vents are provided in the fuel cap to balance the pressure with the atmosphere, and this balance of fuel tank pressure is attained by covers of vents in the fuel cap and the covers having an umbrella or parabolic shape or the vents may be covered by reed valves. The disclosure of covers of vents as described in this invention then obviates the use of coiled metal springs to control vents in vehicle fuel caps.

18 Claims, 4 Drawing Sheets

2
1
5
7
30

2
1
5
7
30

10
2
1
10

2
1
11
11

12
12
3

13
13
4

14
14

15
15
25
20
5

17
17
6

16
16
18
18
7

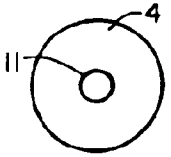
FIG 13
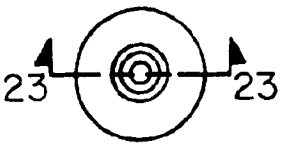
FIG 14
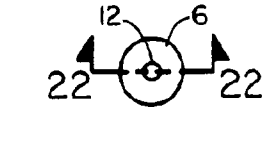
FIG 16
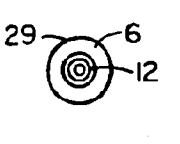
FIG 17
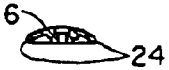
FIG 23
FIG 22
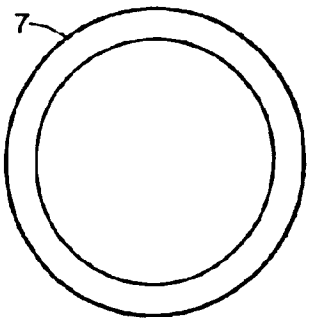
FIG 18
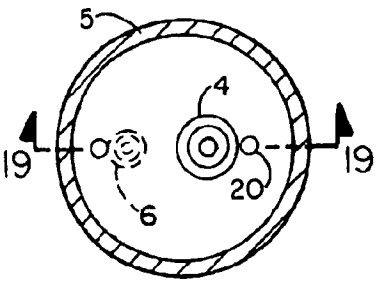
FIG 15
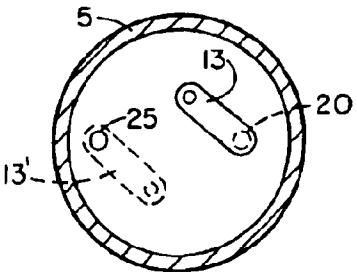
FIG 20

MOTOR VEHICLE FUEL CAP INLET AND OUTLET VENT APPARATUS

Matter enclosed in heavy brackets [ ] appears in the original patent but forms no part of this reissue specification; matter printed in italics indicates the additions made by reissue.

BACKGROUND OF INVENTION

Proper venting of gasoline fuel tanks in cars or vehicles is important to reduce emissions of hydrocarbon fuels into the atmosphere and thus to reduce pollution of the atmosphere. Disclosure is made of a fuel tank cap, with controlled venting both into and out of the fuel tank, and a gasket sealing the cap to the fill pipe of the fuel tank, and the vents maintain minimum ventage of the hydrocarbon fuel vapors.

SUMMARY OF THE INVENTION

Disclosure is made of a car or vehicle fuel cap having an inlet vent valve and an outlet vent valve and each vent valve held in closed position until activated to open position by a pressure differential of pressure build up in the fuel tank for the outlet vent valve to open or the inlet vent valve actuated by negative pressure in the fuel tank, and the vent valves can be described as umbrella shape check valves, or reed valves as alternates to the umbrella valves. This invention then obviates the use of coil compression springs as now used in fuel caps for vent controls.

OBJECTS OF THIS INVENTION

An object of this invention is to disclose and claim a vehicle fuel cap having an inlet vent and an outlet vent and the outlet vent extending upwards, held in closed position by an umbrella shaped cover extending over the vent aperture, and the edges of the umbrella shaped cover riding on the periphery around the outlet vent aperture and the umbrella shaped cover held in position over the outlet vent by fastening of the umbrella shaped cover onto a pillar extending from the vent aperture surface to the center of the concave surface of the umbrella shaped cap, and an inlet aperture extending downward in the fuel cap, and a pillar extending downward next to the inlet aperture and an inverted umbrella shaped cover extending over the inlet aperture, and the inverted umbrella shape cover attached to the pillar and the edge of the concave shape of the inverted umbrella shape extending over the inlet vent aperture.

Another object is to disclose and claim, as an alternate to umbrella shaped valves, reed valves in a fuel cap, and one reed valve in an outlet vent aperture and one reed valve in the inlet aperture, and the reed valves actuated by differential pressure inside and outside of the fuel tank.

PRIOR ART

U.S.Patents:

U.S. Pat. No. 4,337,873 for FUEL CAP WITH POPPET VALVES. Spring loaded valves are disclosed.

U.S. Pat. No. 4,436,219 for SEALING CAP FOR GAS TANK. Pressure and vaccum relief valves are shown U.S. Pat. No. 4,765,505 for DELAYED ACTUATION FUEL CAP. The lost motion of the hub to break the seal on the fill pipe.

U.S. Pat. No. 5,108,001 for PRESSURE RELEASE VENT CAP. Spring loaded vents are disclosed.

U.S. Pat. No. #5,996,829 for FUEL TANK CAP. Disclosure is made of a fuel tank cap to control the pressure in a fuel tank by opening and closing a rubber valve.

U.S. Pat. No. #6,003,709 for FUEL CAP. Electrically conductive fuel cap.

None of the above cited patents anticipate or make obvious the disclosure and claims of this present invention.

BRIEF DESCRIPTION OF DRAWINGS

Figures 1, 2, 3, 4, 5, 6, 7, 8, 9, 10:
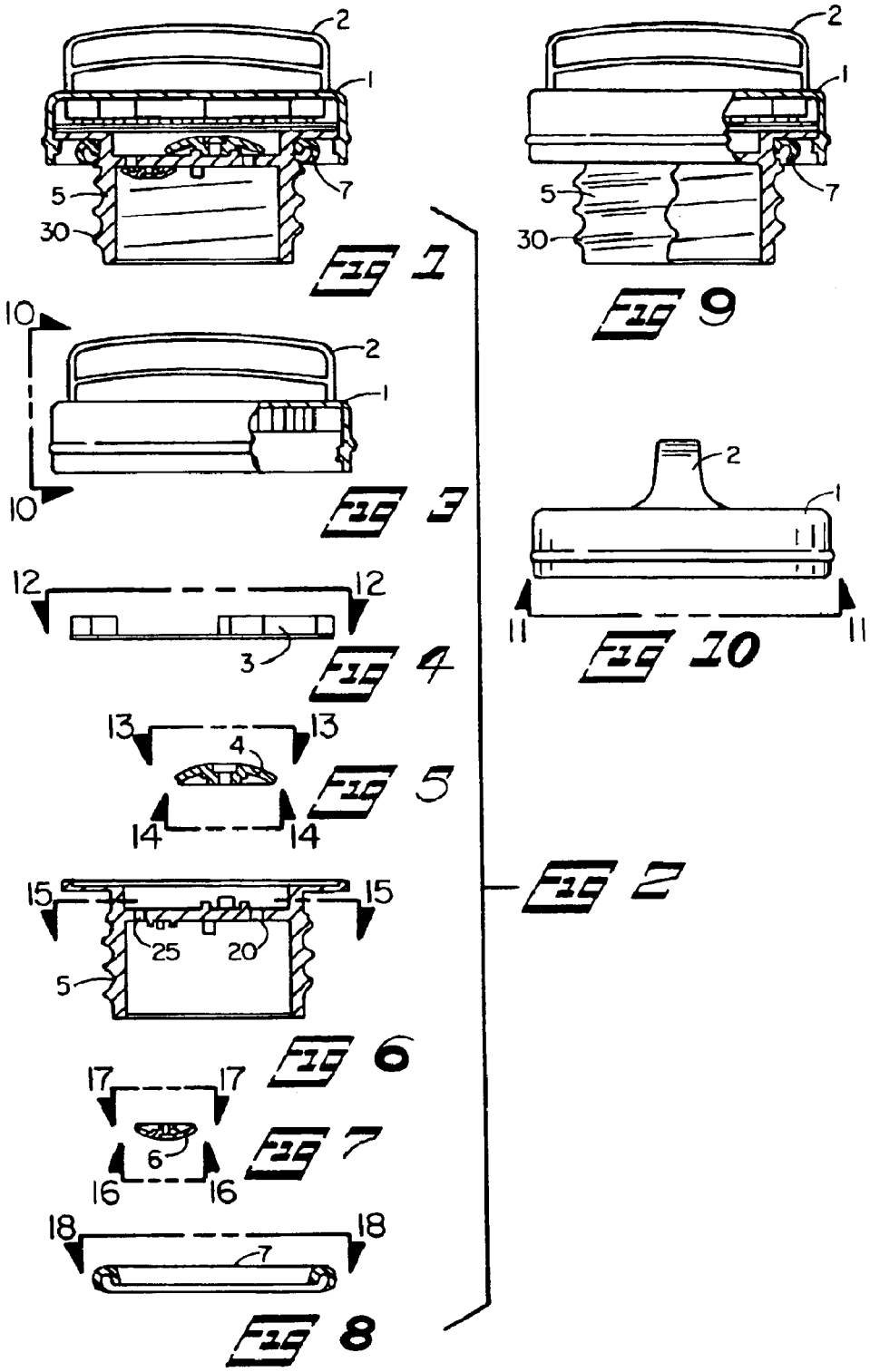
Figure 11:
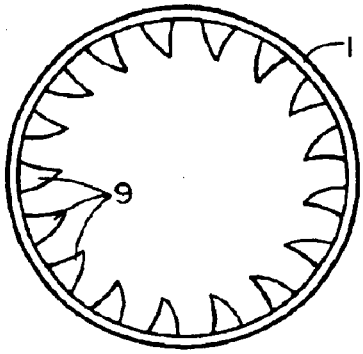
Figure 12:
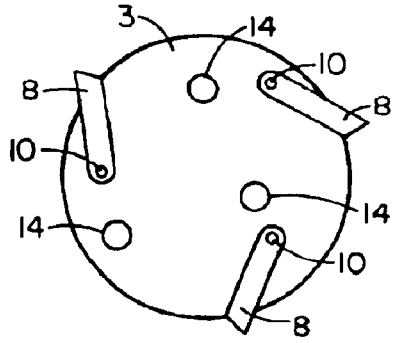
Figure 24:
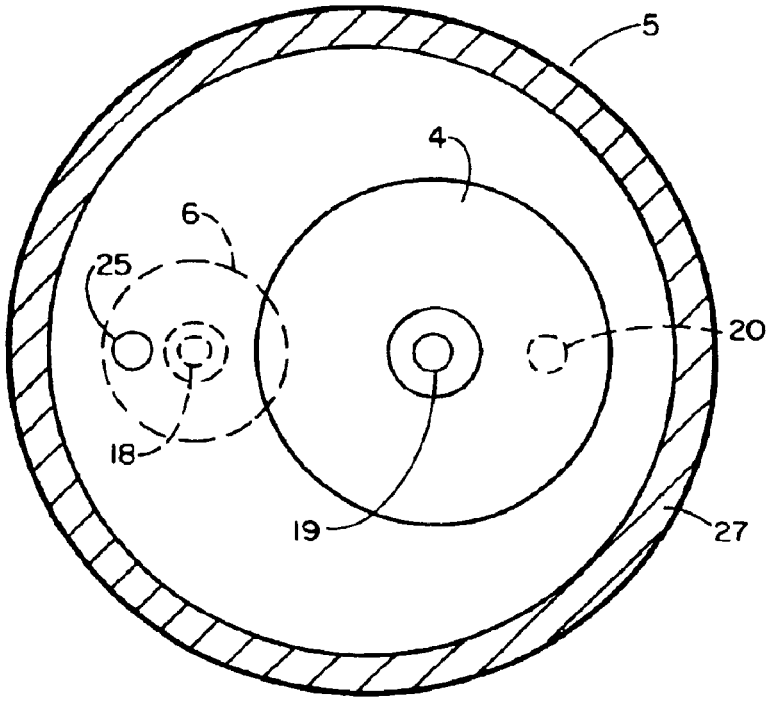
Figure 19:
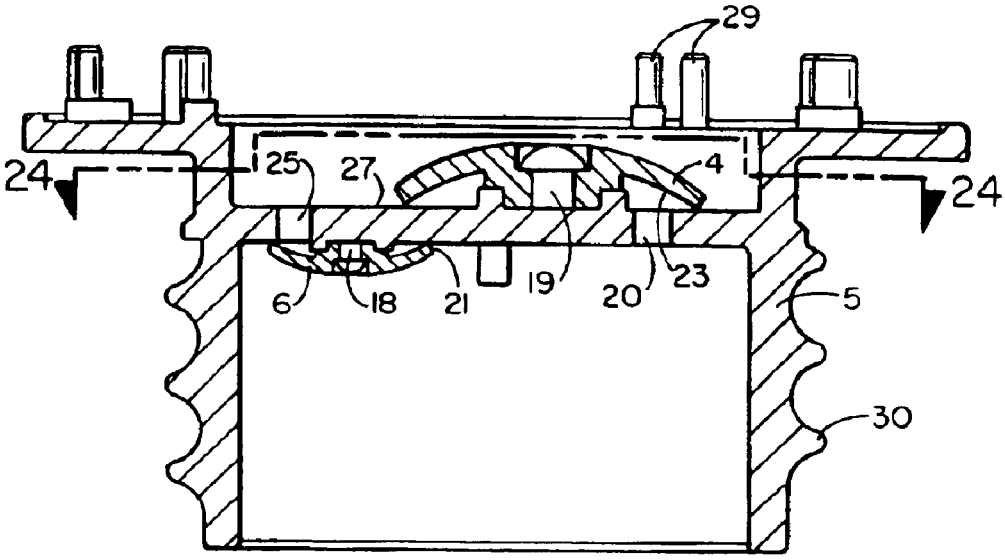
Figure 21:
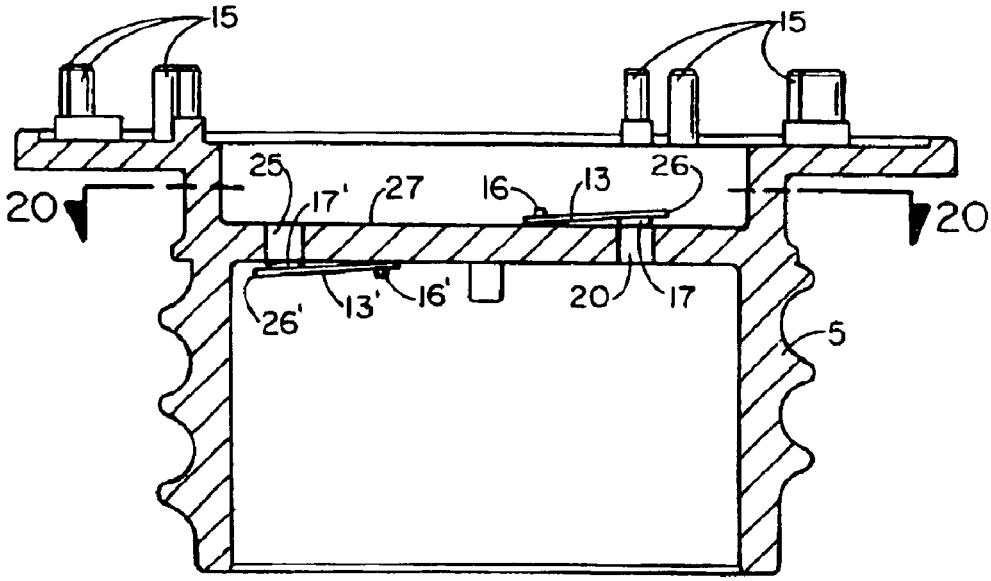

| DRAWING NO. | DESCRIPTION |
|---|---|
| FIG. 1 | Cross section of assembled fuel cap of this invention. |
| FIG. 2 | Components of fuel cap assembly. |
| FIG. 3 | Top component of assembly. |
| FIG. 4 | Torque plate. |
| FIG. 5 | Outlet vent umbrella |
| FIG. 6 | Body of fuel cap. |
| FIG. 7 | Inlet vent umbrella valve. |
| FIG. 8 | Gasket for seal between fuel cap and filler pipe. |
| FIG. 9 | Assembled fuel cap of this invention. |
| FIG. 10 | Elevation view of top component of assembly of FIG. 3 turned 90°. |
| FIG. 11 | Plan view of bottom of top component of assembly. |
| FIG. 12 | Plan view of torque plate of assembly. |
| FIG. 13 | Top plan view of umbrella cover of outlet vent. |
| FIG. 14 | Bottom plan view of umbrella cover of inlet vent. |
| FIG. 15 | Plan view of inlet and outlet umbrella mounting on body of fuel cap. |
| FIG. 16 | Top plan view of umbrella cover of inlet vent. |
| FIG. 17 | Top plan view of umbrella cover of outlet vent. |
| FIG. 18 | Plan view of gasket for seal between fuel cap and filler cap. |
| FIG. 19 | Enlarged elevational view of cross section of body of fuel cap, showing mounts of inlet and outlet umbrella components over vents. |
| FIG. 20 | Plan view of reed valves for inlet/outlet vents. |
| FIG. 21 | Enlarged elevational cross section view of body of fuel cap, showing mounts of inlet/outlet reed valves. |
| FIG. 22 | Cross section of inlet vent umbrella cover. |
| FIG. 23 | Elevation cross section of outlet vent umbrella cover. |
| FIG. 24 | Plan view of top of fuel cap body showing the mounting locations of outlet and inlet vent umbrella covers. |

DRAWING LEGENDS

| LEGEND NO. | DESCRIPTION |
|---|---|
| 1 | Top of fuel cap. |
| 2 | Ridge on top of fuel cap |
| 3 | Torque plate. |
| 4 | Outlet vent umbrella. (parabolic shape) molded of fluorocarbon (thermoplastic) material |
| 5 | Fuel cap body. (molded thermoplastic c.g. nykon. |
| 6 | Inlet vent aperture umbrella cover. (parabolic shape) molded of fluorocarbon (thermoplastic) material. |
| 7 | Sealing gasket between fuel cap and fill pipe. |
| 8 | Pivot arms on torque plate. |
| 9 | Cogs on inner wall of fuel cap. |
| 10 | Pin mounts for pivot |
| 11 | Mounting apertures for outlet vent umbrella. |
| 12 | Mounting holes for inlet inverted umbrella. |
| 13,13' | Reed valve arm vent seals. |
| 14 | mounting hole apertures in torque plate for pins 29 on top of fuel cap body 27 |
| 15 | Mounting posts for top cover of fuel cap. |
| 16,16' | Reed valve arms attached to fuel cap body top 27. |

-continued

| LEGEND NO. | DESCRIPTION |
|---|---|
| 17,17' | Shut-off of vent inlet/outlet apertures. |
| 18 | Pilar post for inlet vent umbrella cover. |
| 19 | Pilar post for outlet vent umbrella cover. |
| 20 | Outlet aperture vent. |
| 21 | Rim edge of inlet vent umbrella. |
| 22 | Periphery of vent aperture. |
| 23 | Concave surface of umbrella shaped cover. |
| 24 | Rim edge of inlet inverted umbrella cover. |
| 25 | Inlet vent aperture. |
| 26,26' | Free end of reed valve arms |
| 27 | Top of fuel cap body. |
| 28 | Rim edge of outlet vent umbrella cover 4. |
| 29 | Torque plate mounting pins on top 27, of fuel cap body 5. |
| 30 | Threads shown on cap body 5 |

DETAILED DESCRIPTION OF INVENTION

This invention is to disclose and claim vehicle fuel cap venting apparatus for controlling positive or negative pressure in a vehicle fuel tank and is described as follows.

FIG. 1 is a cross section elevational view of complete assembly of fuel cap of this invention, and FIG. 9 is an elevational view of the complete assembly of the of vehicle fuel cap venting apparatus of this invention.

The vehicle fuel cap apparatus of this invention includes a vehicle fuel cap apparatus (see FIG. 1) showing the top of fuel cap 1, and ridge 2 on top of the fuel cap and components of which are shown in FIGS. 3,4,5,6,7, and 8 and an inlet vent aperture 25, FIGS. 19, 21 and an outlet vent aperture 20, and the outlet vent 20 extending through the flat top *panel* 27 of the fuel cap body 5, and the vent 20 held in "closed" position (see FIGS. 5, 6,15,19) by an [by an] umbrella or parabola shaped cover 4 (see FIGS. 13, 14, 15, 19) extending over the vent aperture 20, and the edge 28 of the umbrella parabolic shaped cover 4 resting on the periphery 27 around the outlet vent aperture 20 and the umbrella parabola shaped cover 4 held in position (see FIGS. 5,15,19) over the outlet vent aperture 20 by fastening of the umbrella parabola shaped cover 4 onto a pillar post 19 extending from flat top 27 of the fuel cap body 5 through a center mounting aperture 11 of the concave side 23 of the outlet vent umbrella parabola shaped cover 4, and the umbrella cover edge 28 (FIGS. 14,19) extending over the outlet vent aperture 20, and to insure balance of the pressure in the fuel tank there is an inlet vent aperture 25 through the top 27 of the fuel cap body 5, and a pillar post 18 for inlet vent inverted umbrella parabola shaped cover 6 (FIG. 7) extending downward on the vehicle side of the flat top 27 of the fuel cap 5 and covering the inlet vent aperture 25 and the inverted umbrella parabola shape cover 6 attached to the pillar post 18 (FIG. 19) extending through mounting hole 12 in umbrella cover 6, and the edge [29 (FIGS. 17,22)] *24* (*FIG. 22*) of the concave side of the inverted umbrella parabola shape cover 6 extending over the inlet vent aperture 25.

Referring now to FIGS. 1,8, and 9, sealing gasket 7 is shown, which seals the cap in the filler pipe of the vehicle fuel tank. FIG. 18 is a plan view of the gasket 7.

As an alternate apparatus to control the pressure in a vehicle fuel tank cap, reed valves are shown in FIGS. 20,21 in a fuel cap body 5. Outlet reed valve 13 is mounted on the top surface of top section 27 of the fuel cap body 5, and one reed valve 13 mounted on the bottom surface of top 27, of fuel cap body 5 on inlet vent aperture 15 and each reed valve 13,13' is attached on one end to the top surface 27 of the fuel cap body. The reed valves can be identified as the name implies, a reed 13 or 13' one end of which is attached at 16, 16' to the fuel cap body FIG. 21 as stated above and the ends 26,26' of the reeds opposite the attached ends shut-off of valve faces 17,17' fitting over the inlet and outlet apertures 14 and 15 respectively, with reed 13 mounted on the top surface of top 27 of fuel cap body 5.

The reeds 13 13' being flexible are actuated by inlet or outlet pressure on the shut-off valve face contacts 17, 17' to release either excess pressure in the fuel tank, or low pressure or partial vacuum in the fuel tank.

Referring now to FIG. 10, there is shown elevation view of top component 1, of assembly of FIG. 3, rotated 90° of fuel cap 1, showing ridge 2, on top of fuel cap 1. FIG. 11 is plan view of bottom, of top of fuel tank cap 1, showing cogs 9 on inner wall of fuel cap 1. FIG. 12 is plan view of torque plate 3, showing mount aperture 14 to fit over pins 30, on top of fuel cap body 5 and pivot arms 8, on torque plate 3, and the pivot arms 8 flexibly mounted on pin mounts 10, to positively hit cams 9 on counter clock-wise rotation to remove the fuel cap assembly from the fill pipe, and pivot arms 8 riding over the cogs 9 on clock-wise rotation of the fuel cap assembly of FIG. 9.

FIG. 16 is the top plan view of inlet vent aperture umbrella cover 6. FIG. 20 is plan view of reed valves 13, 13' mounted on top surface of fuel cap body 5, and outlet vent 20 and inlet valve 25 shown covered by shut off valve faces 17,17'.

FIG. 23 is a cross section view of outlet vent umbrella cover 4 and FIG. 24 is a plan view of top of fuel cap body showing the mounting locations of outlet and inlet vents and umbrella vent covers in approximate relationship each to the other.

The periphery 22 of the vent apertures are shown as legend 27

The rim edge 24 (FIG. 22) of inlet inverted umbrella cover 6, is in contact with surface of top of fuel cap 5, and the edge 28 of umbrella cover 4 is in contact with the surface 27 of fuel cap 5.

The umbrella parabola shaped covers 4 and 6 when mounted over the apertures as disclosed above, serve as vent control by the edges 24 or 28 being flexed and raised off of contact with the surface around the apertures, to allow for pressure or vacuum relief through its respective vent 20 or 25.

It is to be pointed out that the apertures 20 and 25 are each adjacent to its respective pillar post 19 and 18 under umbrella parabola shape cover 4 and 6 respectively.

The preferred material for the inlet and outlet vent umbrella covers 4 and 6 is fluorocarbon (fluoroplastic) moldings, having a Shore A, 55 to 65 hardness.

The other components may be molded by plastic material such as nylon or similar materials.

The threads 30, of the fuel cap body 5 are shown as coarse threads, but these threads may be replaced by quarter run threads or other means for attaching the fuel cap to the fill pipe.

The reed valve arms are made of stainless steel or similar inert metal, and the shut-off valve face 17, 17' contacts on the arms are preferably of plastic material such as nylon, or fluoropolymer or the metal of the arms would be sufficient to hold the vent closed against a pressure of 1—3 pounds per square inch.

Further description includes an outlet aperture 20 adjacent to a pillar 19, in the fuel cap 5, and an aperture cover 4, having an umbrella or parabola shape mounted on the pillar 19, and the aperture cover concave side 23 edge landed on the surface 27 around the pillar 19 and the outlet aperture 20 and the inlet aperture 25 adjacent to a second pillar 18 in the fuel cap body 5, and a second aperture cover 6 having an umbrella or parabola shape FIGS. 22 and 23, mounted on the second pillar 18 and the concave side 24, of the aperture cover landed on surface around the second pillar 18 and the inlet aperture 25, on the underside flat top 27 of fuel cap body 5.

The fluoropolymer thermoplastic material moldings of aperture covers should have a preferred Shore A hardness of 45 to 65, with a preferred range of 50 to 60 hardness.

The word "landed" means the edges 24 and 28 of the out-let and inlet aperture covers 4 and 6 are in contact with the respective surface around the pillars 18,19 and the apertures 20 and 25, and the attachment of the outlet/inlet umbrella covers 4 and 6 to the pillars 19 and 18 is tight to prevent any vent leakage between the pillars and the umbrella covers.

As an alternative, to obviate springs in a vehicle fuel cap outlet and inlet vent apparatus a first outlet aperture 20 vent in a fuel cap body 5 and a metal reed 13 attached on one end 6 and adjacent to outlet aperture 20 vent the end 26 of the reed 13 opposite to attached end 16 extending over aperture 20 to close the outlet aperture 20, end of the metal reed 13 opposite to the attached end in shut off contact with the outlet aperture vent 20, and, an inlet aperture 25 in the fuel cap body 5, a second metal reed 13' attached to one end 16' and adjacent to aperture 25 for inlet vent, the end 26' of the second metal reed 13' opposite to attached end 16', extending to cover inlet aperture vent 25, and end 26' of the second metal reed opposite to the attached end 16 in shut off contact with the aperture 25.

In all of the above discussion and disclosure, the umbrella parabola covers 4 and 6, and reed valves 13 and 13' are actuated to vent either in or out by a pressure difference between the fuel tank and the atmosphere pressure.

What is claimed is:

1. Vehicle fuel cap outlet and inlet valve apparatus wherein the improvement comprises;

a an outlet aperture adjacent to a piller in fuel cap body, b umbrella or parabola shaped aperture cover having a mounting aperture to receive said pillar c an aperture cover concave side edge landed on surface around said pillar and said outlet aperture, and, d an inlet aperture adjacent to a second pillar in said fuel cap body, e a second aperture cover having an umbrella or parabola shape having a mounting aperture to receive said second pillar, f and concave side edge of said aperture cover, landed on surface around said second pillar and said inlet [aperture] *aperture.*

2. Vehicle fuel cap outlet and inlet venting apparatus of claim 1 further comprising;

a said outlet aperture cover and said inlet aperture cover comprised of thermoplastic material having a Shore A scale hardness of 45 to 65.

3. Vehicle fuel cap outlet and inlet vent apparatus of claim 2 further comprising;

a said outlet aperture cover and said inlet aperture cover comprised of fluoropolymer thermoplastic material having a Shore A scale hardness of 45 to 65.

4. Vehicle fuel cap outlet and inlet vent apparatus of claim 2, further comprising;

a said outlet aperture cover and said inlet aperture cover, having an umbrella or parabolic shape consisting of fluoropolymer thermoplastic molded material and said molded material having a Shore A scale hardness of 50 to 60.

5. Vehicle fuel cap outlet and inlet vent apparatus wherein the improvement comprises;

a a first outlet aperture vent in a fuel cap body, b a first metal reed attached on one end and adjacent to said outlet aperture vent c the end of said reed opposite to attached end extending to close said outlet aperture, d end of said metal reed opposite to said attached end in shut off contact with said outlet aperture vent and, e an inlet aperture in said fuel cap body, f a second metal reed attached on one end and adjacent to aperture for inlet vent, g the end of said second metal reed opposite to attached end, extending to cover said inlet aperture, and h end of second metal reed opposite to said attached end in shut off contact with said inlet aperture, and i a coating of plastic elastomer on said shut off ends of said reed valves.

6. Vehicle fuel cap outlet and inlet vent apparatus of claim 5, further comprising;

a a coating of fluoropolymer thermoplastic on said shut off ends of said reed valves.

*7. Vehicle fuel cap apparatus comprising:*

*(a) a fuel cap body having an outlet aperture and an inlet aperture therein;*

*(b) a support member in said fuel cap body adjacent said outlet aperture;*

*(c) an outlet aperture cover covering said outlet aperture and having a mounting aperture to receive said support member and being adapted to flex between opening and closing positions of said outlet aperture;*

*(d) a second support member in said fuel cap body and disposed adjacent said inlet aperture; and*

*(e) an inlet aperture cover covering said inlet aperture, and having a mounting aperture to receive said second support member, and being adapted to flex between opening and closing positions of said inlet aperture.*

*8. The vehicle fuel cap apparatus defined in claim 7, wherein said outlet aperture and inlet aperture covers are comprised of thermoplastic material.*

*9. The vehicle fuel cap apparatus defined in claim 7, wherein at least one of said outlet and inlet aperture covers is comprised of fluoropolymer thermoplastic material.*

*10. The vehicle fuel cap apparatus defined in claim 7 wherein each of said aperture covers tightly surrounds its supporting support member to thereby prevent vent leakage between its support member and said aperture cover.*

*11. The vehicle fuel cap apparatus defined in claim 7, including (f) an annular gasket surrounding said fuel cap body, said gasket being C-shaped in cross section.*

*12. The vehicle fuel cap apparatus defined in claim 7, wherein said inlet aperture cover and said outlet aperture cover face in opposite directions.*

*13. The vehicle fuel cap apparatus defined in claim 7, wherein said inlet aperture cover and said outlet aperture cover are spaced vertically.*

*14. The vehicle fuel cap apparatus defined in claim 7, wherein said inlet aperture cover and said outlet aperture cover face in opposite directions and are spaced vertically.*

*15. The vehicle fuel cap apparatus defined in claim 7, wherein said inlet aperture cover and said outlet aperture cover are spaced radially relative to said fuel cap body.*

*16. Vehicle fuel cap apparatus comprising:*

(*a*) *a fuel cap body having a top panel which has a top surface and an underside;*

(*b*) *said panel having an outlet aperture and an inlet aperture each of which extends through said panel between said top surface and said underside;*

(*c*) *an outlet aperture cover, covering said outlet aperture at said top surface of said panel;*

(*d*) *an inlet aperture cover, covering said inlet aperture at said underside of said panel;*

(*e*) *a first support member carried by said cap body adjacent said outlet aperture and supporting said outlet aperture over said outlet;*

(*f*) *a second support member carried by said cap body adjacent said inlet aperture and supporting said inlet aperture cover over said inlet aperture;*

(*g*) *said outlet aperture cover having a mounting aperture to receive said first mentioned support member and being adapted to flex between open and closed positions of said outlet aperture; and*

(*h*) *said inlet aperture cover having a mounting aperture to receive said second-mentioned support member and being adapted to flex between open and closed positions of said inlet aperture.*

*17. Vehicle fuel cap apparatus comprising:*

(*a*) *a fuel cap body having a top panel which has a top surface and an underside;*

(*b*) *said panel having an outlet aperture and an inlet aperture, each of which extends through said panel between said top surface and said underside;*

(*c*) *an outlet aperture cover covering said outlet aperture at said top surface of said panel; said outlet aperture cover having a mounting aperture therein;*

(*d*) *a support member carried by said panel adjacent said outlet aperture cover and extending into said mounting aperture in supporting relation to said outlet aperture cover;*

(*e*) *an inlet aperture cover covering said inlet aperture at said underside of said panel, said inlet aperture cover having a mounting aperture therein to receive a support member therein;*

(*f*) *a second support member carried by said panel adjacent said inlet aperture cover and extending into said second-mentioned mounting aperture in supporting relation to said inlet aperture cover;*

(*g*) *each of said aperture covers having an aperture-closing surface comprised of a plastic elastomer.*

*18. Vehicle fuel cap apparatus comprising:*

(*a*) *a fuel cap body;*

(*b*) *a pillar carried by said body;*

(*c*) *an outlet aperture extending through said body adjacent said pillar;*

(*d*) *an outlet aperture cover, said cover having a mounting aperture to receive said pillar;*

(*e*) *a second pillar carried by said body;*

(*f*) *an inlet aperture extending through said body adjacent said second pillar;*

(*g*) *an inlet aperture cover having a mounting aperture to receive said second pillar;*

(*h*) *said outlet aperture cover having a concave side edge landed on surface around said first mentioned pillar; and*

(*i*) *said inlet aperture cover having a concave side edge landed on surface around said second-mentioned pillar.*

* * * * *